(12) United States Patent
Faucher et al.

(10) Patent No.: US 11,099,205 B2
(45) Date of Patent: Aug. 24, 2021

(54) PRESTRAINED VIBRATING ACCELEROMETER

(71) Applicants: CENTRE NATIONAL DE LA RECHERCHE SCIENTIFIQUE, Paris (FR); UNIVERSITE DE LILLE, Lille (FR)

(72) Inventors: Marc Faucher, Lesquin (FR); Christophe Morelle, Bihorel (FR)

(73) Assignees: CENTRE NATIONAL DE LA RECHERCHE SCIENTIFIQUE, Paris (FR); UNIVERSITE DE LILLE, Lille (FR)

( * ) Notice: Subject to any disclaimer, the term of this patent is extended or adjusted under 35 U.S.C. 154(b) by 322 days.

(21) Appl. No.: 16/301,384

(22) PCT Filed: May 9, 2017

(86) PCT No.: PCT/EP2017/061007
§ 371 (c)(1),
(2) Date: Nov. 13, 2018

(87) PCT Pub. No.: WO2017/194509
PCT Pub. Date: Nov. 16, 2017

(65) Prior Publication Data
US 2020/0319227 A1    Oct. 8, 2020

(30) Foreign Application Priority Data
May 11, 2016  (FR) ...................................... 1654199

(51) Int. Cl.
*G01P 15/09* (2006.01)
*G01P 15/097* (2006.01)
*G01P 1/00* (2006.01)

(52) U.S. Cl.
CPC .............. *G01P 15/097* (2013.01); *G01P 1/00* (2013.01); *G01P 15/0907* (2013.01)

(58) Field of Classification Search
CPC .............. G01P 15/097; G01P 15/0907; G01P 15/0915; G01P 15/0922; G01P 15/09
See application file for complete search history.

(56) References Cited

U.S. PATENT DOCUMENTS 4,945,765 A * 8/1990 Roszhart ............. G01P 15/0802
73/514.29
6,510,738 B1 * 1/2003 Lee ........................ G01H 11/08
310/312

(Continued)

FOREIGN PATENT DOCUMENTS

GB        2 270 198 A      3/1994
WO      2010/116061 A1   10/2010

OTHER PUBLICATIONS

Hopkins et al., "The Silicon Oscillating Accelerometer: A MEMS Inertial Instrument for Strategic Missile Guidance", The Draper Technology Digest, 2000, pp. 44-51, vol. 5 CSDL-R-2907.

(Continued)

*Primary Examiner* — Helen C Kwok
(74) *Attorney, Agent, or Firm* — Nixon & Vanderhye

(57) ABSTRACT

A device for measuring an acceleration includes a vibrating accelerometer including: a semiconductor substrate forming a fixed frame of the accelerometer; a test weight of the same material as the substrate and connected to the fixed frame, movable translationally along at least one sensing axis of the vibrating accelerometer; a guide of the same material as the substrate, connected to the fixed frame and test weight, guiding the test weight in the direction of the sensing axis; a layer made of a piezoelectric semiconductor deposited on the substrate, the layer being tensilely prestrained; a resonator in the layer connected to the fixed frame, the resonator (Continued)

subjected to tension or compression in the direction of the sensing axis; and at least one transducer connected to the resonator, able to actuate the resonator, to keep the resonator oscillating and/or to detect an electrical signal generated by the resonator.

20 Claims, 3 Drawing Sheets

(56) References Cited

U.S. PATENT DOCUMENTS

| | | | | |
|---|---|---|---|---|
| 2008/0202239 A1* | 8/2008 | Fazzio | ................. | G01P 15/125 |
| | | | | 73/504.18 |
| 2008/0229566 A1* | 9/2008 | Saito | ................... | G01P 15/0802 |
| | | | | 29/25.35 |
| 2011/0234206 A1 | 9/2011 | Kawakubo et al. | | |
| 2012/0297877 A1* | 11/2012 | Watanabe | ............. | G01P 15/097 |
| | | | | 73/514.29 |
| 2012/0304769 A1* | 12/2012 | Watanabe | ........... | G01P 15/0802 |
| | | | | 73/514.01 |

OTHER PUBLICATIONS

International Search Report, dated Jun. 30, 2017, from corresponding PCT application No. PCT/EP2017/061007.
French Search Report, dated Nov. 10, 2016, from corresponding FR application No. 1654199.

* cited by examiner

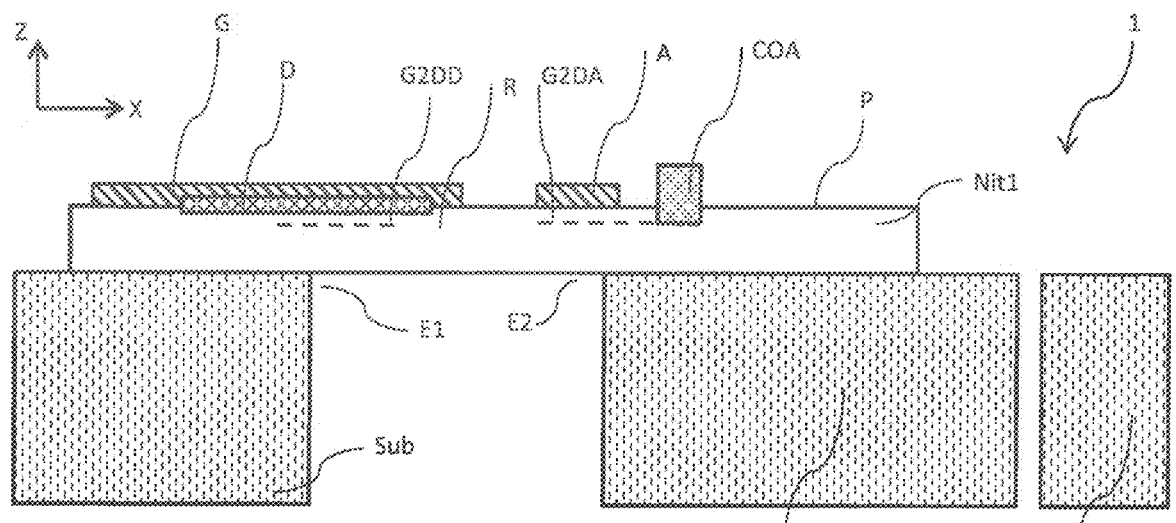
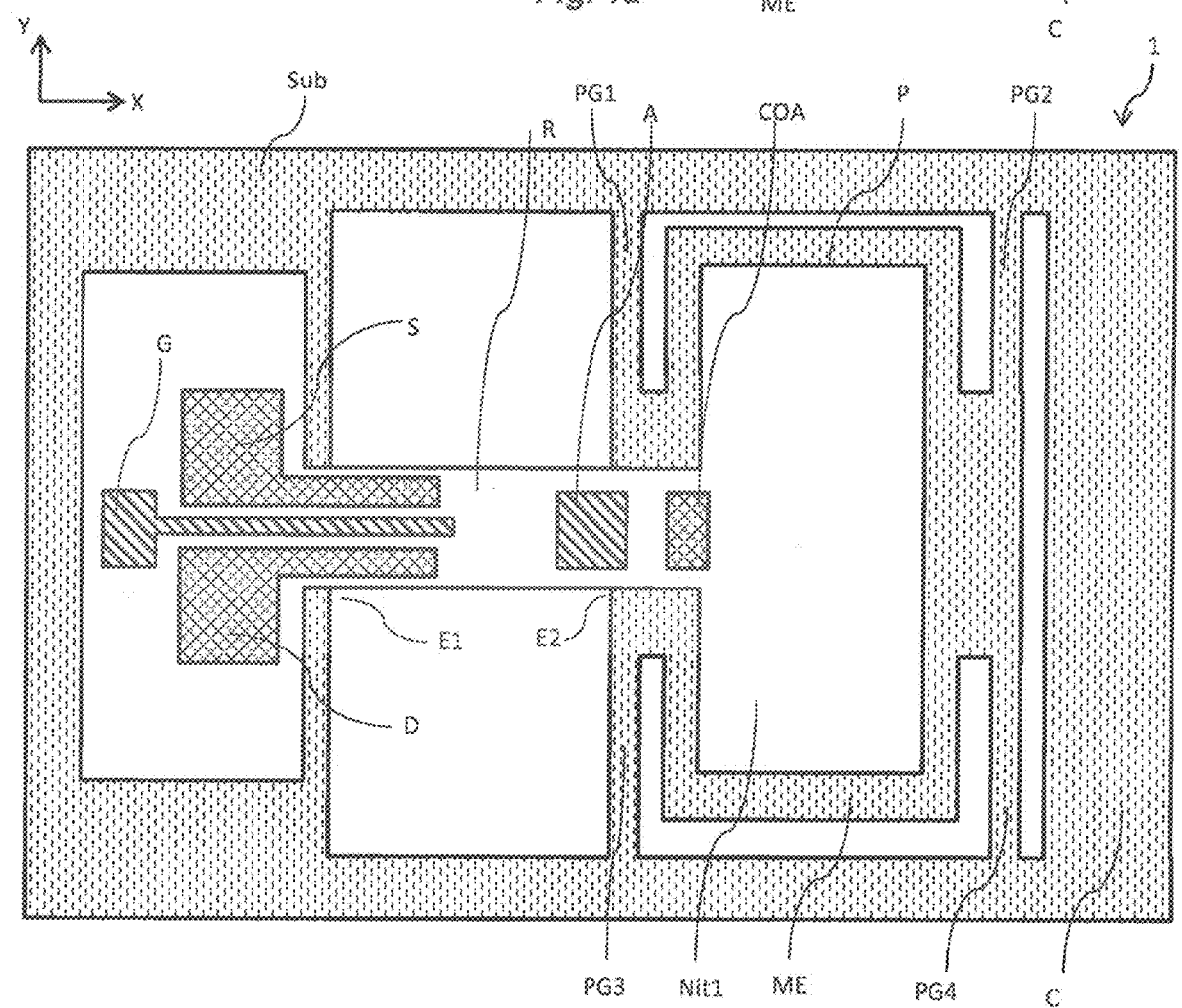

PRESTRAINED VIBRATING ACCELEROMETER

BACKGROUND OF THE INVENTION

Field of the Invention

The present invention relates to a microelectromechanical device at least partially constituted by a piezoelectric semiconductor material. The invention particularly relates to a high-performance vibrating accelerometer intended for measuring accelerations in environments subject to high temperatures and/or subject to strong accelerations.

Description of the Related Art

Microelectromechanical (or MEMS, MicroElectroMechanical Systems) sensors have known significant development in recent decades. Manufactured using techniques borrowed from microelectronics, these devices typically include mechanical elements with sub-millimetric dimensions (embedded beams, membranes, etc.), together with actuators to move the mechanical elements and/or sensors to detect the movement of mechanical elements. The role of a MEMS sensor is thus to deliver a signal, often electrical, when an external stress is applied to it.

To measure an acceleration, a MEMS sensor generally includes a test mass supported by one or more flexible elements. This test mass moves under the effect of an acceleration, this acceleration being measurable by said MEMS sensor.

To obtain good sensitivity of this type of sensor, rigidly connecting the test mass to a resonator in order to produce a vibrating accelerometer is known. Said resonator comprises for example a vibrating beam embedded on one side in a fixed support and on the other in the test mass, which is mobile with respect to the support. Said vibrating beam has at least one axis sensitive to accelerations in a given direction. The resonator has the property of oscillating according to different resonance modes, these resonance modes being characterized by a set of natural frequencies. Such a resonator can also include transducers that enable the actuation and/or detection of these resonance modes. When the device undergoes an acceleration, the test mass is subjected to an inertial force. This inertial force has the effect of creating a mechanical stress on the resonator. Under the effect of this mechanical stress, all of the natural resonance frequencies of the resonator are changed. A measurement of the frequency variation of said resonator makes it possible to deduce the value of the acceleration that the device has undergone.

In particular, silicon or quartz MEMS vibrating accelerometers are known. For example, the document by R. E. Hopkins, J. T. Borenstein, B. M. Antkowiak, P. A. Ward, R. D. Elliot, M. S. Weinberg, M. D. Depiero, and J. A. Miola, "*The Silicon Oscillating Accelerometer: A MEMS Inertial Instrument for Strategic Missile Guidance*," pp. 44-51, 2000, describes accelerometers comprising such vibrating accelerometers, on which the vibration mode used is the first bending mode.

However, it is well known to a skilled person in the art that the performance of MEMS vibrating accelerometers is limited by several factors. In particular, the quality factor of the resonator used, the measurement range of the measurable acceleration, or even the resolution of such vibrating accelerometers are not always such that they can provide satisfactory performance in harsh environments. By "harsh environments" is meant environments involving high temperatures, particularly 100° C. to 500° C., and/or subject to strong vibrations or accelerations, particularly 100 g to 10,000 g, where g is the acceleration of gravity, equal to 9.81 m/s$^2$. For example, under the effect of a strong acceleration that generates compressive stress, the beam contained in the resonator can undergo a buckling phenomenon. Excessive stress can, in particular, result in the failure of the beam, and therefore damage the resonator.

In addition, MEMS vibrating accelerometer technologies that use semiconductor materials such as silicon, either for the transducers or for integrated electronics, are often limited by their operating temperatures. It must be noted that quartz or langasite/langatate-based technologies are limited in terms of miniaturization by the manufacturing methods that can be used in these areas.

BRIEF SUMMARY OF THE INVENTION

The present invention aims to overcome the aforementioned drawbacks by changing the architecture of the known microelectromechanical devices of the prior art. To this end, the invention proposes a device for measuring an acceleration characterized in that it includes a vibrating accelerometer comprising:
  a substrate constituted by a semiconductor material and forming a fixed framework of said accelerometer;
  a test mass constituted by one and the same material as said substrate and connected to said fixed framework, said test mass being capable of translating along at least one sensitive axis of said vibrating accelerometer;
  guiding means constituted by one and the same material as said substrate and connected to said fixed framework and to said test mass, said guiding means being capable of guiding said test mass in the direction of said at least one sensitive axis;
  a layer constituted by a piezoelectric semiconductor material and deposited on said substrate, said layer being prestressed in tension;
  a resonator located in said layer and connected to said fixed framework, said resonator being capable of being subjected to tension or compression in the direction of said at least one sensitive axis; and—at least one transducer connected to said resonator, said at least one transducer being capable of actuating said resonator, keeping said resonator oscillating and/or detecting an electrical signal generated by said resonator.

Advantageously, said substrate is an active layer of a silicon-on-insulator substrate.

Advantageously, said layer is made from a different material from the substrate, particularly a III-N (nitride) type material, the group III element being chosen from Al, Ga, In, B or any alloy of these elements, preferably Ga.

Advantageously, said resonator includes a thickness comprised between 0.5 microns and 10 microns.

Advantageously, said transducer includes a heterostructure confining in said layer at least one two-dimensional charge carrier gas in a plurality of regions, said at least one two-dimensional gas forming at least one electrically conductive channel extending in said layer, said at least one electrically conductive channel being electrically connected to said layer.

Advantageously, said transistor comprises a plurality of electrodes located on said layer and electrically connected to said heterostructure.

Advantageously, at least one of said electrodes of said transistor is an ohmic contact.

Advantageously, said transducer comprises a plurality of electrodes, at least two of said electrodes being connected to said layer and/or to a two-dimensional charge carrier gas.

Advantageously, said resonator includes a plurality of interdigitated combs, said interdigitated combs being electrically connected to said resonator and to a plurality of electrodes formed on said fixed framework by a plurality of tracks, said tracks being constituted by a metal or semiconductor material.

Advantageously, said resonator is embedded over part of its perimeter and has the form of either:—a beam; —a membrane; a disk; or—a plate.

Advantageously, said resonator includes an acoustic cavity, said acoustic cavity comprising phononic crystals.

BRIEF DESCRIPTION OF THE DRAWINGS

Other advantages and characteristics of the invention will become apparent on examination of the detailed description of an embodiment which is in no way limitative, and the attached drawings, in which:

Other characteristics, details and advantages of the invention will become apparent on reading the description, made with reference to the attached drawings given as an example and in which, respectively:

FIGS. 1a and 1b respectively show a cross-sectional view and a top view of a prestressed vibrating accelerometer according to a first embodiment of the invention.

DETAILED DESCRIPTION OF THE PREFERRED EMBODIMENTS

Figure 2:
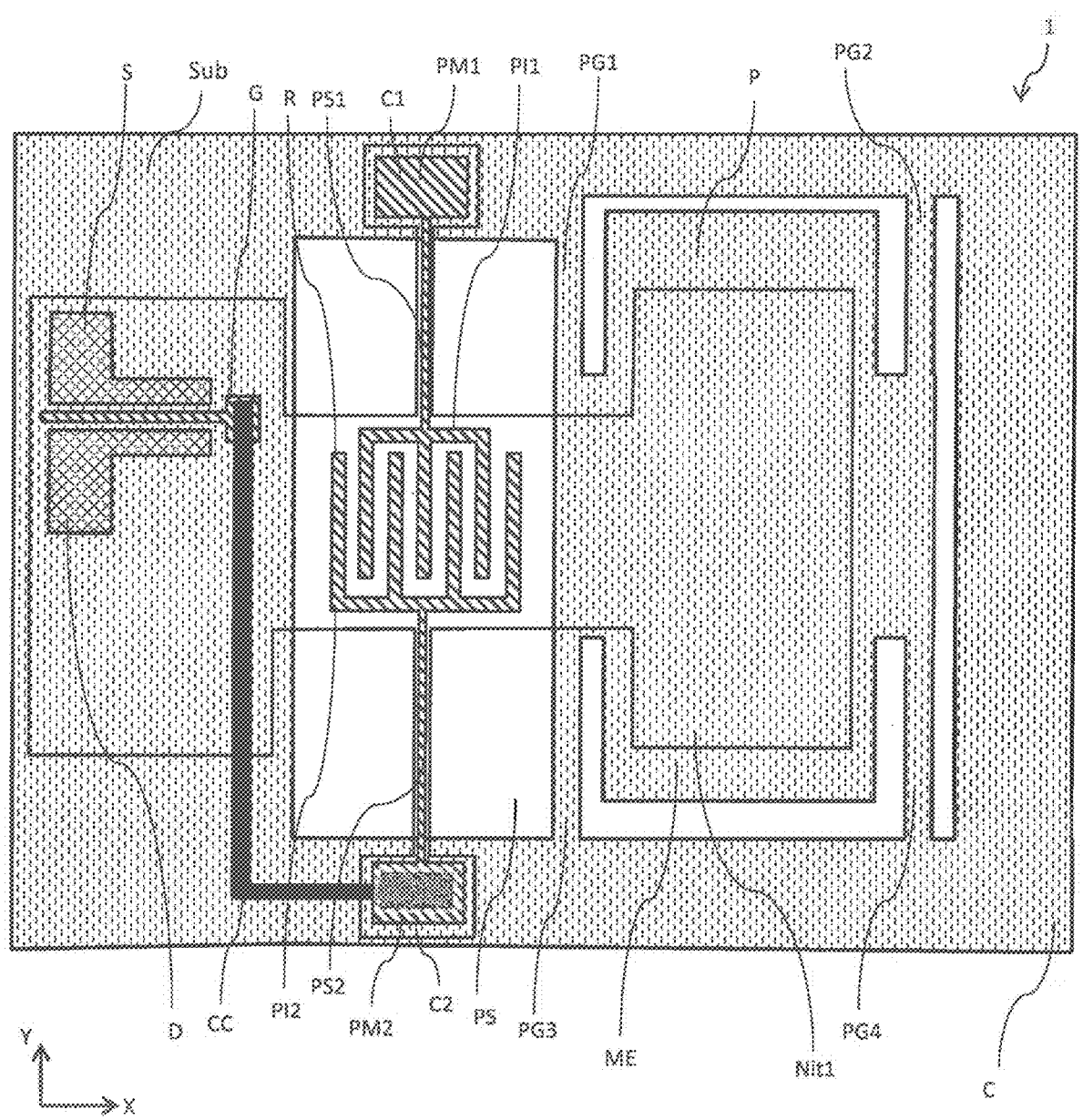
FIG. 2 shows a top view of a prestressed vibrating accelerometer according to a second embodiment of the invention.

It will be noted here that the figures are not to scale, and that the present invention is not limited to the aforementioned embodiments.

According to one or more of the embodiments as described, the invention thus relates in particular to an electromechanical device intended for measuring accelerations, made from a piezoelectric semiconductor layer, known as the nitride layer, deposited on a silicon substrate. Said device includes a test mass defined in said substrate and capable of moving along at least one sensitive axis under the effect of an acceleration, together with a resonator defined in said nitride layer and making it possible to measure said acceleration. Surprisingly, the inventors have found that producing a vibrating accelerometer including such a nitride layer prestressed in tension has a favourable effect on the performances of a vibrating accelerometer. In particular, an accelerometer according to one of the embodiments of the invention makes it possible to increase the measurement range, resolution and quality factor under a variety of operating conditions.

In addition, the inventors have found that producing a vibrating accelerometer comprising a nitride layer, said nitride layer including a III-N (nitride) type material, for example gallium nitride GaN, increases the accuracy of the acceleration measurement in harsh environments, particularly in the presence of temperatures comprised between 100° C. and 500° C., and/or subject to strong vibrations or accelerations comprised between 100 g and 10,000 g. Enhanced performance can be obtained in the presence of high temperatures and pressures.

The design of MEMS vibrating accelerometers according to one or more embodiments of the invention as described below is based, in particular, on stacking different layers constituted by semiconductor materials.

FIGS. 1a and 1b respectively show a cross-sectional view and a top view of a vibrating accelerometer 1 according to a first embodiment of the invention, said accelerometer being sensitive to variations in acceleration in the direction given by the axis X. Hereinafter, the direction given by the axis X will define the direction called the sensitive axis of the device.

As shown, the accelerometer 1 comprises a stack of semiconductor layers. This stack of layers makes it possible to produce a measuring device sensitive to the mechanical stresses applied to said device. Such a stack is made from a substrate Sub made up of a semiconductor material, for example silicon Si or silicon carbide SiC. According to an embodiment of the invention, the substrate Sub is an active layer of a silicon-on-insulator (SOI) substrate. The layer Sub is etched so that one or more semiconductor layers can be released above Sub. Said substrate can be etched physically and/or chemically. This etching can be carried out on the basis of a mask defined by lithography, and/or plasma etching steps. This etching enables the release of said layers.

According to an embodiment of the invention, the device includes a test mass ME made in the substrate Sub. Said test mass can be produced by deep etching. Said test mass is configured so that it can translate along at least one sensitive axis of said vibrating accelerometer.

When the device is being produced, the layer Sub makes it possible to release at least one layer Nit1, called the nitride layer. According to an embodiment of the invention, the substrate Sub makes it possible to release in particular a portion of said nitride layer. According to an embodiment of the invention, said nitride layer is constituted by a material identical to that of the substrate Sub. According to another embodiment of the invention, the layer Nit1 comprises a material different from that constituting the substrate Sub. The layer Nit1 extends partially above the layer Sub and is in contact with it. The layer Nit1 typically has a thickness of a few microns (0.5-10 microns, and for example 2 microns), while the layer Sub is substantially thicker (100-500 microns, and for example 270 microns). The dimensions of the suspended element depend on the desired mechanical characteristics of the vibrating accelerometer.

The layer Nit1 is a layer constituted by a piezoelectric semiconductor material. According to an embodiment of the invention, the layer Nit1 can comprise nitrides of group III elements, i.e. one or more III-N (nitride) type materials, the group III element being chosen from Al, Ga, In, B, or any alloy of these elements. According to an embodiment of the invention, said materials can be doped in order to improve the electronic performance of the device, particularly to reduce the electrical resistivity thereof, or to facilitate the production of contacts making it possible to connect it electrically to the outside world.

According to an embodiment of the invention, the layer Nit1 is advantageously constituted by gallium nitride GaN. The group III element nitrides have the property of being both semiconductor and piezoelectric materials. It will be noted that a stack according to an embodiment of the invention can also include one or more additional layers, said layers preferably comprising the aforementioned elements.

The device also includes a fixed framework C made from a material identical to the material mainly forming the substrate Sub and/or the test mass ME. Said fixed framework makes it possible to mechanically support the layer Nit1 and the various elements thereof, and constitutes a fixed part of the accelerometer 1. The test mass ME is connected to said fixed framework by means of guiding means (PG1, PG2, PG3, PG4) capable of guiding said test mass in the direction of said at least one sensitive axis. In FIGS. 1a and 1b, the device is characterized by a single sensitive axis, the direction of which is parallel to the direction of the axis X. Said guiding means are preferably constituted by the same material as said substrate, and are connected to said fixed framework and to the test mass ME. Preferably, said guiding means are designed so that their stiffness has little impact on the transfer of a mechanical stress between said test mass and the other elements comprised in the vibrating accelerometer 1.

Said guiding means are, for example, mobile hinges enabling ME to move relative to the fixed framework C and in the direction of the sensitive axis when a mechanical stress is applied to the device, particularly when a mechanical stress is applied to the test mass ME in the direction of the sensitive axis. These guiding means also make it possible to limit the movements of the test mass ME in the directions of acceleration other than the sensitive axis. As shown in FIGS. 1a and 1b, an accelerometer according to an embodiment of the invention can include, in particular, four guiding beams PG1, PG2, PG3 and PG4 connecting the fixed framework C to the test mass ME. In FIGS. 1a and 1b, the beams PG1, PG2, PG3 and PG4 also make it possible to provide improved guiding of ME near the four corners of ME in the direction of the sensitive axis.

It will be noted that the position of the guiding means is not limited by the present description. In particular, a guiding beam can be connected to the test mass ME closer to the centre thereof. During production of the device, the guiding means (PG1, PG2, PG3, PG4) can optionally have an initial deformation.

As shown in FIGS. 1a and 1b, a resonator R is made in the nitride layer Nit1. Said resonator R can be in the form of either a beam, a membrane, a disk or a plate. In particular in the present example, the resonator R is a rectangular vibrating beam P, said beam P being embedded on one side in the framework C in an anchor E1 and embedded on the other side in the test mass in an anchor E2. According to an embodiment of the invention, said anchors E1 and E2 are two straight lines defined by the intersection of the etching planes of the substrate and the lower surface of the layer Nit1. According to an embodiment of the invention, the anchors E1 and E2 are located on the edges of the substrate Sub.

According to an embodiment of the invention, the layer Nit1 can comprise a heterostructure, said heterostructure comprising a two-dimensional charge carrier gas, which is located in regions G2DA and G2DD following the manufacturing process. Said regions are located in the upper part of the layer Nit1 and on the inside thereof. Said heterostructure can, in particular, form an High Electron Mobility Transistor (HEMT). Said heterostructure makes it possible, in particular, to perform electrical detection of mechanical vibrations, and to amplify this electrical detection. The regions corresponding to these two-dimensional charge carrier gases, the outlines of which are shown in dotted lines in FIG. 1a, are located underneath the visible plane of said layer in FIG. 1b. Said regions make it possible to form at least one high electron mobility conductive channel in the nitride layer Nit1. The properties of the two-dimensional charge carrier gases, known per se, enable the charge carriers moving in said regions to enjoy significantly greater electron mobility than the carriers moving in the other parts of the layer Nit1. This results in enhanced performance for an accelerometer according to one of the embodiments of the invention.

As shown in FIGS. 1a and 1b, regions G2DA and G2DD are electrically connected to the surface of the resonator R by means of an electrode COA, said electrode passing partially or completely through the layer Nit1. According to an embodiment of the invention, it is possible to produce said electrode COA on the layer Nit1 by diffusion and creation of alloys, said electrode forming an ohmic contact. Such an electrode can be obtained, in a manner known per se, by depositing metal on the upper surface of the layer Nit1, then heating the assembly so as to facilitate the diffusion of the metal atoms.

As shown in FIGS. 1a and 1b, a vibrating accelerometer according to one of the embodiments of the invention can include a resonator R located in the layer Nit1, arranged in contact with the fixed framework C in the anchor E1 and with the vibrating test mass ME in the anchor E2. In particular, a vibrating accelerometer according to one of the embodiments of the invention can also include a transducer making it possible to actuate the resonator R, and/or to detect an electrical signal emitted by it. In particular, the resonator R can be connected to a set of electronic elements making it possible to actuate it and/or measure at least one of its resonance frequencies. Said transducer can thus include an electrode COA, an electrode A, and a region of the layer Nit1 confining a two-dimensional electron gas, for example the region G2DA. The electrode A can be integrated by means of different manufacturing steps, including one or more deposition phases.

According to an embodiment of the invention, said resonator is capable of undergoing tension or compression in the direction of the sensitive axis of the vibrating accelerometer 1. In particular, said resonator is configured to oscillate according to a set of natural resonance frequencies. The values of these natural frequencies depend on several parameters, particularly the thickness of the layer Nit1 or even the distance between the anchors E1 and E2. A specific choice of these parameters can be performed to set the sensitivity of the device 1 for more or less accurate acceleration measurement.

According to an embodiment of the invention, said resonator is made from the same material as that constituting the nitride layer Nit1. According to an embodiment of the invention, the resonator R has a length typically comprised between 100 and 500 microns, particularly 390 microns, and a thickness typically comprised between 0.5 and 10 microns, particularly 2 microns.

When the accelerometer 1 undergoes an acceleration along a sensitive axis, an inertial force is applied to the test mass ME. The test mass ME then undergoes a movement with respect to the fixed framework C in a direction parallel to that of the sensitive axis, applying mechanical stress to the layer Nit1, and therefore to the resonator R. Said mechanical stress can be compressive or tensile stress. Under the effect of the application of mechanical stress, the resonator R evaluates the acceleration corresponding to the movement of the test mass ME. It will be noted that if the mechanical stress is compressive stress applied by the test mass ME to the layer Nit1, and therefore to the resonator R, said resonator can undergo buckling. This buckling can lead to the failure of said resonator. The buckling and failure of a material depend on different parameters, including its intrinsic properties. For a resonator constituted by a beam made from a semiconductor material, the yield point is generally of the order of one gigapascal.

When compressive or tensile stress and/or compressive or tensile prestress is applied to it, the structure of the resonator R is deformed so that at least one natural resonance frequency characterizing it varies as a function of the corresponding acceleration. Thus, by measuring the variation of the natural frequency of the resonator, it is possible to deduce the intensity and direction of the acceleration along the sensitive axis therefrom.

According to an embodiment of the invention, the accelerometer 1 can also comprise a field effect transistor. Said field effect transistor can be used for example to detect the vibrations of the resonator R, and/or to amplify an electrical signal generated by said resonator. The electrodes of said transistor, called the drain D, source S and gate G, are made on the upper part of the layer Nit1. Typically, the electrodes S, G and D are arranged so that they are connected to the region G2DD confined in the layer Nit1.

The contacts S and D of this transistor can be produced by deposition of a metal such as titanium or aluminium. This deposition can be followed by an annealing step to enable the diffusion of the dopants in the semiconductor material. Preferably, these steps are carried out such that the contact or contacts formed are characterized by very low resistivity. Minimising the electrical resistivity of these contacts makes it possible to facilitate the injection and/or extraction of an electrical current into the device. Said contacts are ohmic contacts.

The gate electrode G, optionally constituted by a material different from that of the contacts S and D, extends on a surface of the layer Nit1. Said electrode makes it possible to modulate the flow of the current in the conductive channels of the regions G2DD and G2DA. The electrode G is electrically connected to the layer Nit1. All of these electrodes make it possible, for example, to inject an electrical current into the transducer. It will be noted that the position of the electrodes of such a transistor is not limited by the present description. In particular, the electrodes can be arranged such that said electrodes are connected to at least one transistor located on the layer Nit1, but not on the resonator R.

According to an embodiment of the invention, the accelerometer 1 can include a resistive dipole.

In a non-limitative manner, a resistive dipole of the accelerometer 1 can be formed from the electrodes S and D. For example, the electrodes S and D can form the terminals of this resistive dipole, while the gate electrode G is not used.

According to an embodiment of the invention, the resistive dipole is a variable resistor comprising a plurality of electrodes (D, S) located on the layer Nit1, these electrodes being electrically connected to the heterostructure.

Advantageously, the presence of a resistive dipole makes it possible to form a piezoresistive transducer to produce a variable resistance gauge.

When the accelerometer 1, the transducer or one of the components of the transducer such as the resonator R is subjected to stress, a variation in resistance occurs at the terminals of the resistive dipole, for example at the terminals of the electrodes S and D. This variation in resistance results from the variation in the oscillation frequency of the device, for example due to the stress or a variation in resistivity in one of the layers of the device.

Advantageously, an accurate measurement of the variation in the oscillation frequency of the device can be obtained by means of a measurement of the variation in resistance at the terminals of the resistive dipole.

According to an embodiment of the invention, said resistive dipole can be a variable resistor, for example a variable piezoresistor. In a non-limitative manner, the resistance value of this resistive dipole can be greater than 50 ohms and less than 10 kiloohms.

According to an embodiment of the invention, the layer Nit1 is constituted by a prestressed material. Said material is, in particular, prestressed in tension on the substrate Sub. This prestressing can be obtained from the production of the layer Nit1 using high-temperature epitaxial growth, particularly between 800 and 1,000° C., from the substrate Sub. In particular, the layer Nit1 and the layer Sub can be made from materials comprising crystals characterized by a mesh parameter. In particular, the materials constituting the layer Nit1 and the substrate Sub can be crystals with different mesh parameters. This has the effect of creating prestress, or more generally stress, during growth. This stress can, in particular, be tensile stress. It should also be noted that some tensile stress can result from the fact that the materials constituting the layer Nit1 and the layer Sub have different thermal expansion coefficients. At the end of growth, bringing the device to ambient temperature makes it possible to generate tensile stress, particularly tensile prestress.

Advantageously, the presence of tensile prestress in the layer Nit1 makes it possible to improve the performance of a vibrating accelerometer. Surprisingly, the inventors have discovered that a vibrating accelerometer produced comprising a nitride layer prestressed in tension has better performance than an accelerometer of the prior art. In particular, the inventors have found that imposing tensile prestress increases the range of measurement of the accelerations measured by such an accelerometer. Said measurement range can be defined as the width of the interval [−a, +a] of the measurable accelerations comprised between the smallest acceleration −a measurable by the accelerometer and the largest acceleration +a measurable by it. Advantageously, the measurement range of an accelerometer according to one of the embodiments of the invention, particularly an accelerometer comprising a vibrating beam with the same features as those described above, is of the order of 1,115 g in the presence of tensile prestress of 70 megapascals, i.e. an improvement of more than a factor of 4 in the corresponding measurement range with respect to an accelerometer that is not prestressed. In addition, it is observed that the quality factor of such a prestressed resonator increases considerably when the prestress applied is greater. Similarly, the presence of tensile prestress in the layer Nit1 makes it possible to produce an accelerometer with better resolution than in the absence of prestress.

According to the prior art, the use of different materials to produce the substrate and the resonator of an accelerometer creates thermal drift capable of affecting the accuracy of the measurements obtained. It is thus generally accepted that the performance of an accelerometer comprising different materials to form the substrate Sub and the nitride layer Nit1 is disadvantageous. Surprisingly, the inventors have discovered that an accelerometer characterized by a substrate Sub and a layer Nit1 made from different materials could after all offer better performance than an accelerometer wherein these materials are identical, for example when the test mass ME and the resonator R are made from one and the same material.

In particular, said substrate can be constituted by silicon Si or silicon carbide SiC. According to an embodiment of the invention, the layer Nit1 can, in particular, contain a layer of SiC. According to another embodiment of the invention, the substrate Sub can be an active layer of a silicon-on-insulator substrate. Preferably, the layer Nit1 is made from a III-N (nitride) type material, and the group III element can be aluminium Al, gallium Ga, indium In, boron B, or an alloy of these elements. Preferably, the layer Nit1 is made from GaN. The inventors have found that producing an accelerometer having at least one GaN semiconductor layer enables the operation of a prestressed vibrating accelerometer at higher temperatures. In addition, a device comprising one or more layers of GaN enables the integration of electronics better able to withstand harsh environments. Furthermore, such a device enables the monolithic integration of amplification transistors near the accelerometer. In particular, it will be noted that the substrate Sub can also include one or more transistors located on or near the test mass ME. This or these transistor(s) typically have a conductive channel located in the nitride layer Nit1, at least one of these transistors being electrically connected to the resonator R to enable the measurement of an electrical signal generated by said resonator.

Advantageously, the characteristics described above, particularly the presence of a prestressed nitride layer Nit1, enable the device to achieve greater measurement ranges, and wider measurement bandwidths, compared to the known devices of the prior art. This improved performance can be described using a factor, the scale factor $K_n$, which characterises the sensitivity of the sensor to an acceleration. This sensitivity can be expressed as a function of the prestressing of the layer Nit1, and as a function of the frequency $f_n$ of the nth bending mode, also called the nth vibration mode.

According to the inventors, the resolution of a vibrating accelerometer is proportional to the quantity $$\frac{f_n}{2Q_n K_n},$$

where $Q_n$ denotes quality factor of the vibrating accelerometer. Thus, the quality factor $Q_n$ increases in the presence of stress. In addition, it will be noted that the resolution of a vibrating accelerometer is barely modified in the presence of stress for the fundamental vibration mode, or in the absence of stress for the fundamental vibration mode. However, the resolution of a vibrating accelerometer increases greatly if higher resonance modes are used. Moreover, producing the test mass ME over the entire thickness of the substrate Sub makes it possible to obtain a large frame, connected to a beam with a small cross-section, which directly improves the resolution.

The measurement range of a devise according to an embodiment of the invention is limited by buckling, and depends on the maximum force applicable to the beam. The maximum acceleration is thus measurable more advantageously in the presence of prestress $\sigma_0$ than in the absence of prestress, i.e. when $\sigma_0=0$. The Young's modulus of gallium nitride is higher than that of conventional materials such as silicon or quartz. As a result, the measurement range of a gallium nitride-based device is greater than that of a silicon or quartz-based device. In addition, the presence of prestress makes it possible to increase this measurement range considerably, reaching values 5 to 10 times higher than a non-prestressed device. Higher values can also be reached as a function of the dimensions of the beam.

The inventors have thus shown that in the absence of any prestress, the measurement range of an accelerometer comprising a GaN vibrating beam with dimensions of 390 μm×20 μm×1.8 μm as a resonator is of the order of 244 g when said beam is subjected to 70 MPa of tensile prestress. The columns of the table below show the results corresponding to the frequencies $f_n$ (in kHz), scale factor $K_n$ (in Hz per units of g) and measurement ranges (in units of g) for different vibration modes of a device as described, without prestress and in the presence of 70 MPa of prestress:

| | without prestress ($\sigma_0 = 0$) | | | with prestress ($\sigma_0 = 70$ MPa) | | |
|---|---|---|---|---|---|---|
| | Mode number | | | | | |
| | 1 | 2 | 3 | 1 | 2 | 3 |
| $f_n$ (kHz) | 82 | 226 | 444 | 173 | 372 | 620 |
| $K_n$ (Hz/g) | 163 | 222 | 243 | 77 | 135 | 174 |
| Measurement range (g) | | | 244 | | | 1,115 |

As shown by these results, the presence of prestress makes it possible to achieve greater measurement ranges. In addition, the frequencies $f_n$ are higher when $\sigma_0$ equals 70 MPa rather than zero, which means that wider measurement bandwidths can be envisaged. It will be understood that this is generally true when $\sigma_0$ is non-zero.

According to an embodiment of the invention, the use of different materials and the tensile prestressing of the material composing the layer Nit1 therefore makes it possible to produce a resonator R having an improved quality factor, a wider measurement range and increased resolution vis-á-vis the accelerometers of the prior art. In addition, the inventors have found that tensile prestressing of the material composing the nitride layer Nit1 makes it possible to prevent the phenomenon of buckling of the resonator R. In other words, the value of the minimum mechanical stress that must be applied to said resonator to provoke buckling thereof is changed to a more advantageous value when the layer Nit1 is initially prestressed in tension during the production of the stack of layers.

It will be noted here that the present invention is not limited to vibrating beams. FIG. 2 shows a top view of a prestressed vibrating accelerometer according to a second embodiment of the invention. In particular, the present invention can relate to a vibrating accelerometer prestressed in tension, including a vibrating plate PS capable of detecting an acceleration along at least one sensitive axis. According to an embodiment of the invention, said vibrating accelerometer can include elements, particularly said vibrating plate, arranged to detect an acceleration along a sensitive axis, particularly oriented in the direction X.

According to an embodiment of the invention, said vibrating plate is prestressed in tension. When mechanical stress causes the movement of the test mass ME in the plane formed by the direction X, this movement can be detected using a resonator R that can be mechanically stressed in the same direction X. In particular, R has at least one vibration mode characterized by a natural frequency that can be changed under the effect of deformation in the direction X. According to an embodiment of the invention, a resonator R comprised in said vibrating plate is characterized by one or more resonance frequency(ies) corresponding to the vibration modes of said plate. Said vibration modes, called plate vibration modes are obtained due to different limit conditions, said limit conditions depending on the possible dimensions and forms of the layer Nit1. The comb PI1 is used to actuate the vibrating accelerometer. The vibration modes are detected using the interdigitated comb PI2 located on the resonator R. Other electrodes, not shown in FIG. 2, can also be integrated in order to define an electrical earth. Said interdigitated combs are connected to bump contacts located on the fixed framework C by means of metal tracks PM1 and PM2. Said tracks extend at least partially on bridges PS1 and PS2 that are preferably constituted by the same material as the layer Nit1. According to an embodiment of the invention, the tracks PM1 and PM2 are arranged on portions of the layer Nit1 and meet the bump contacts located on the framework C.

According to an embodiment of the invention, one of the two electrodes, for example the electrode C2, can be in contact with the gate G of a transistor by means of an electrical connection CC, said field effect transistor being formed by a set of electrodes (S, G and D) as described above.

Figure 3:
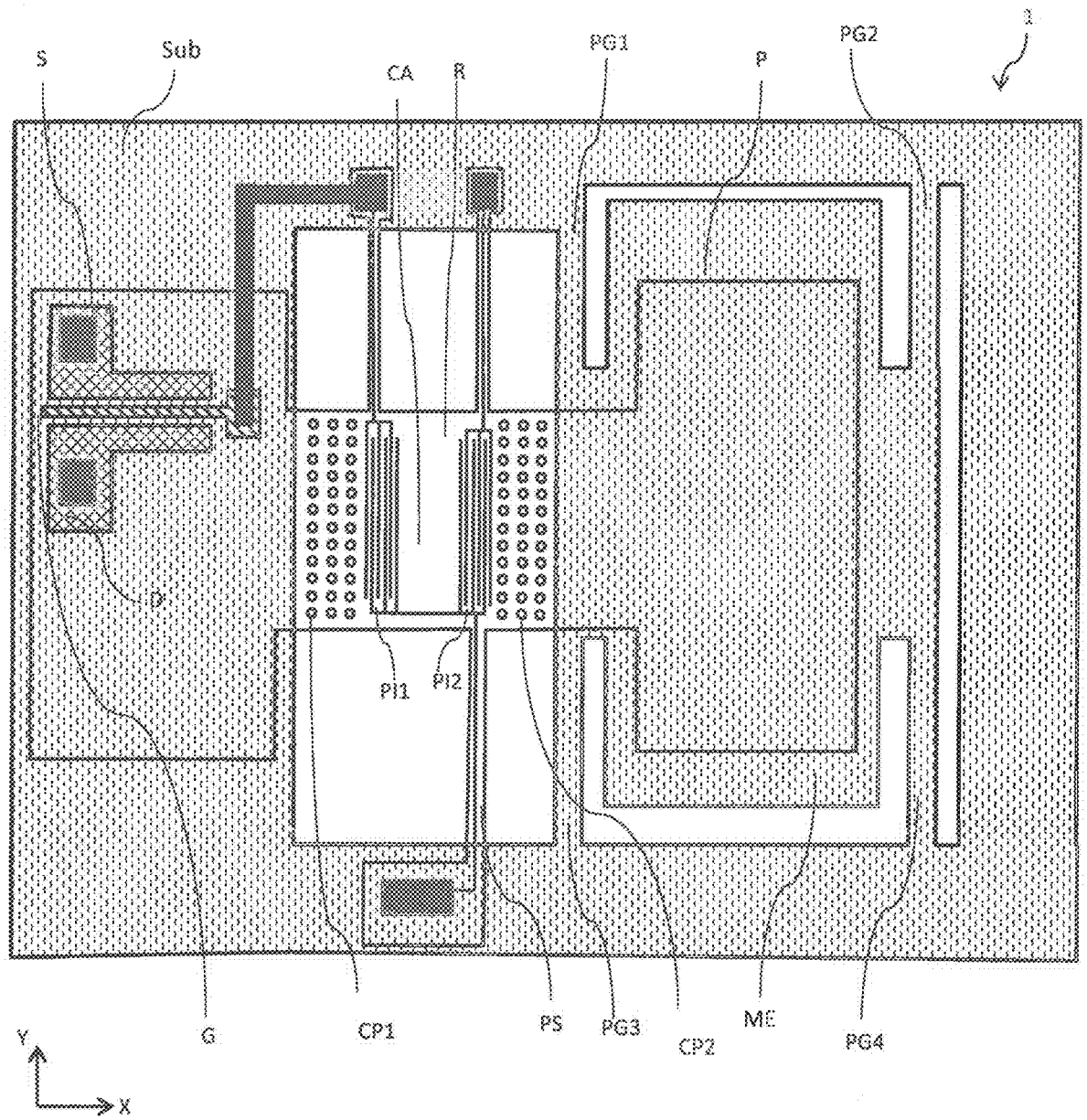
FIG. 3 shows a top view of a prestressed vibrating accelerometer according to a third embodiment of the invention.

FIG. 3 shows a top view of a vibrating accelerometer prestressed in tension according to a third embodiment of the invention. As shown, this embodiment of the invention can relate to a prestressed vibrating accelerometer, including a vibrating plate PS capable of detecting an acceleration along one or more sensitive axes. This embodiment includes a set of elements similar to the embodiments described above, including a resonator R. In addition, this embodiment of the invention can include an acoustic cavity CA. Said acoustic cavity can, in particular, be a resonant wave cavity forming a capacitive space. Advantageously, this embodiment makes it possible to improve the sensitivity of the resonator R, and therefore of the vibrating accelerometer. The acoustic cavity can also, for example, be defined by two phononic crystals CP1 and CP2, together with two series of interdigitated combs PI1 and PI2. Said acoustic cavity can be defined by acoustic mirrors formed by a network of holes located in the layer Nit1. In response to an acceleration along a sensitive axis facing in the direction X, the test mass ME applies mechanical stress to the vibrating plate PS, and changes the dimensions of said cavity. The natural resonance frequencies of the resonator R can thus vary under the effect of these changes in dimensions. The variation in said natural frequencies can then be used to determine with greater accuracy the acceleration to which the device is subjected. In addition, interdigitated combs PI1 and PI2 can be located on the edges of the acoustic cavity CA as described above. These characteristics make it possible to improve the sensitivity and performance of a vibrating accelerometer according to the embodiments of the invention as described above.

The invention claimed is:

1. A device for measuring an acceleration comprising:
a vibrating accelerometer comprising:
  a substrate constituted by a semiconductor material and forming a fixed framework of said accelerometer,
  a test mass constituted by the same material as said substrate and connected to said fixed framework, said test mass being configured to translate along at least one sensitive axis of said vibrating accelerometer,
  a guiding system constituted by the same material as said substrate and connected to said fixed framework and to said test mass, said guiding system being configured to guide said test mass in a direction of said at least one sensitive axis,
  a layer constituted by a piezoelectric semiconductor material and deposited on said substrate, said layer being prestressed in tension,
  a resonator located in said layer and connected to said fixed framework, said resonator being configured to undergo tension or compression in the direction of said at least one sensitive axis, and
  at least one transducer connected to said resonator, said at least one transducer being configured to actuate said resonator, keeping said resonator oscillating and/or detecting an electrical signal generated by said resonator.

2. The device according to claim 1, wherein said substrate is an active layer of a silicon-on-insulator substrate.

3. The device according to claim 1, wherein said layer is made from a material different from the substrate, the material being a III-N (nitride) type material, the III-N type material being chosen from Al, Ga, In, and B or any alloy of Al, Ga, In, and B.

4. The device according to claim 1, wherein said resonator comprises a thickness comprised between 0.5 microns and 10 microns.

5. The device according to claim 1, wherein said transducer includes a heterostructure confining in said layer at least one two-dimensional charge carrier gas in a plurality of regions, said at least one two-dimensional charge carrier gas forming at least one electrically conductive channel extending in said layer, said at least one electrically conductive channel being electrically connected to said layer.

6. The device according to claim 5, wherein said transducer includes a variable resistor, said variable resistor comprising a plurality of electrodes located on said layer, and electrically connected to said heterostructure.

7. The device according to claim 5, wherein said transducer includes a transistor comprising
a plurality of electrodes located on said layer and electrically connected to said heterostructure.

8. The device according to claim 7, wherein at least one of said electrodes of said transistor is an ohmic contact.

9. The device according to claim 1, wherein said transducer comprises a plurality of electrodes, at least two of said electrodes being connected to said layer and/or to a two-dimensional charge carrier gas.

10. The device according to claim 1, wherein said resonator includes a plurality of interdigitated combs, said interdigitated combs being electrically connected to said resonator and to a plurality of electrodes formed on said fixed framework by a plurality of tracks, said tracks being constituted by a metal or semiconductor material.

11. The device according to claim 1, wherein said resonator is embedded on a portion of a perimeter of the device and has the form of one of:
a beam,
a membrane,
a disk, and
a plate.

12. The device according to claim 1, wherein said resonator includes an acoustic cavity comprising phononic crystals.

13. The device according to claim 1, wherein said layer is made from a III-N (nitride) type material, the III-N (nitride) type material being Ga.

14. The device according to claim 2, wherein said layer is made from a material different from the substrate, the material being a III-N (nitride) type material, the III-N type material being chosen from Al, Ga, In, and B or any alloy of Al, Ga, In, and B.

15. The device according to claim 2, wherein said resonator comprises a thickness comprised between 0.5 microns and 10 microns.

16. The device according to claim 3, wherein said resonator comprises a thickness comprised between 0.5 microns and 10 microns.

17. The device according to claim 2, wherein said transducer includes a heterostructure confining in said layer at least one two-dimensional charge carrier gas in a plurality of regions, said at least one two-dimensional charge carrier gas forming at least one electrically conductive channel extending in said layer, said at least one electrically conductive channel being electrically connected to said layer.

18. The device according to claim 3, wherein said transducer includes a heterostructure confining in said layer at least one two-dimensional charge carrier gas in a plurality of regions, said at least one two-dimensional charge carrier gas forming at least one electrically conductive channel extending in said layer, said at least one electrically conductive channel being electrically connected to said layer.

19. The device according to claim 4, wherein said transducer includes a heterostructure confining in said layer at least one two-dimensional charge carrier gas in a plurality of regions, said at least one two-dimensional charge carrier gas forming at least one electrically conductive channel extending in said layer, said at least one electrically conductive channel being electrically connected to said layer.

20. The device according to claim 6, wherein said transducer includes a transistor comprising
   a plurality of electrodes located on said layer and electrically connected to said heterostructure.

* * * * *